United States Patent
Cook et al.

(10) Patent No.: US 10,158,594 B2
(45) Date of Patent: Dec. 18, 2018

(54) GROUP HEADERS FOR DIFFERENTIATING CONVERSATION SCOPE AND EXPOSING INTERACTIVE TOOLS

(71) Applicant: Microsoft Technology Licensing, LLC, Redmond, WA (US)

(72) Inventors: Jason A. Cook, Renton, WA (US); Nicholas S. Smith, Seattle, WA (US); Skye Lee Pazuchanics, Duvall, WA (US); Pallavi S. Mavinkurve, Sammamish, WA (US); Den Delimarschi, Seattle, WA (US); Weina Xie, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 14/855,866

(22) Filed: Sep. 16, 2015

(65) Prior Publication Data

US 2017/0078233 A1     Mar. 16, 2017

(51) Int. Cl.
*H04L 12/58*     (2006.01)

(52) U.S. Cl.
CPC .............. *H04L 51/22* (2013.01); *H04L 51/12* (2013.01)

(58) Field of Classification Search
CPC ................................ H04L 51/12; H04L 51/22
See application file for complete search history.

(56) References Cited

U.S. PATENT DOCUMENTS

| | | | |
|---|---|---|---|
| 6,247,043 B1 | 6/2001 | Bates et al. | |
| 7,617,276 B2 | 11/2009 | Bui | |
| 7,895,524 B2 | 2/2011 | Zaner et al. | |
| 8,166,119 B2 | 4/2012 | Ligh et al. | |
| 8,566,412 B2 | 10/2013 | Barman et al. | |
| 2002/0138582 A1* | 9/2002 | Chandra | G06Q 10/107 709/206 |
| 2006/0085502 A1* | 4/2006 | Sundararajan | G06Q 10/107 709/204 |
| 2007/0061738 A1* | 3/2007 | Taboada | G06Q 10/107 715/752 |
| 2009/0106375 A1 | 4/2009 | Carmel et al. | |
| 2010/0082759 A1* | 4/2010 | Nalliah | H04L 51/38 709/206 |

(Continued)

FOREIGN PATENT DOCUMENTS

CN     100433733 C     11/2008

OTHER PUBLICATIONS

Specification 'vCard the electronic business card version 2.1' (Sep. 18, 1996) to Versit. ("Versit").*

(Continued)

*Primary Examiner* — June Y Sison

(57) ABSTRACT

Aspects of the present disclosure relate to systems and methods for differentiating a conversation scope within an email application. A personal view may be rendered within an email application. The personal view may include at least one personal message and one group message. A group header may be rendered within the personal view in response to a selection of the at least one group message. The group header may include at least a group trigger. A group view may be rendered within the email application in response to a selection of the group trigger. The group view may include a group view header.

20 Claims, 12 Drawing Sheets

(56) References Cited

U.S. PATENT DOCUMENTS

| | | | |
|---|---|---|---|
| 2011/0196933 A1* | 8/2011 | Jackson | G06Q 10/107 709/206 |
| 2012/0158841 A1 | 6/2012 | Liu | |
| 2012/0159375 A1* | 6/2012 | Shaw | G06F 3/0483 715/777 |
| 2013/0069969 A1 | 3/2013 | Chang et al. | |
| 2013/0268839 A1 | 10/2013 | Lefebvre et al. | |
| 2014/0222933 A1 | 8/2014 | Stovicek et al. | |
| 2014/0258432 A1 | 9/2014 | Zheng et al. | |
| 2015/0350143 A1* | 12/2015 | Yang | G06F 3/0482 345/173 |

OTHER PUBLICATIONS

"Welcome!", Published on: Oct. 31, 2014, Available at: http://www.emclient.com/tools/documentation.pdf.

"Email Market", Published on: Nov. 2013 Available at: http://www.radicati.com/wp/wp-content/uploads/2013/11/Email-Market-2013-2017-Executive-Summary.pdf.

* cited by examiner

GROUP HEADERS FOR DIFFERENTIATING CONVERSATION SCOPE AND EXPOSING INTERACTIVE TOOLS

BACKGROUND

Email applications may facilitate communication between at least two people. Communication via email applications may involve tracking multiple conversations, files, and meetings, for example. Current email applications may require multiple interactions from a user to track conversations, files, and meetings. For example, a user may be required to search the inbox of the email application to find conversations on a specific topic. In another example, a user may be required to search the email application and/or utilize external bookmarks to access tools associated with the email application. In this regard, communicating (e.g., tracking conversations, files, and meetings) via current email applications may be time consuming, inefficient, and result in a decline in productivity and/or content organization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for differentiating a conversation scope within an email application. In aspects, a personal view may be rendered within an email application. The personal view may include at least one personal message and one group message. A group header may be rendered within the personal view in response to a selection of the at least one group message. The group header may include at least a group trigger. A group view may be rendered within the email application in response to a selection of the group trigger. The group view may include a group view header.

In other aspects, a personal view may be rendered within an email application, where the personal view includes a plurality of messages. A selection of the one of the plurality of messages may be received. In response to receiving the selection of one of the plurality of messages, it may be determined whether the selected message is a group message. In response to determining that the selected message is a group message, a group header may be rendered within the personal view. The group header may include at least a group trigger.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1A:
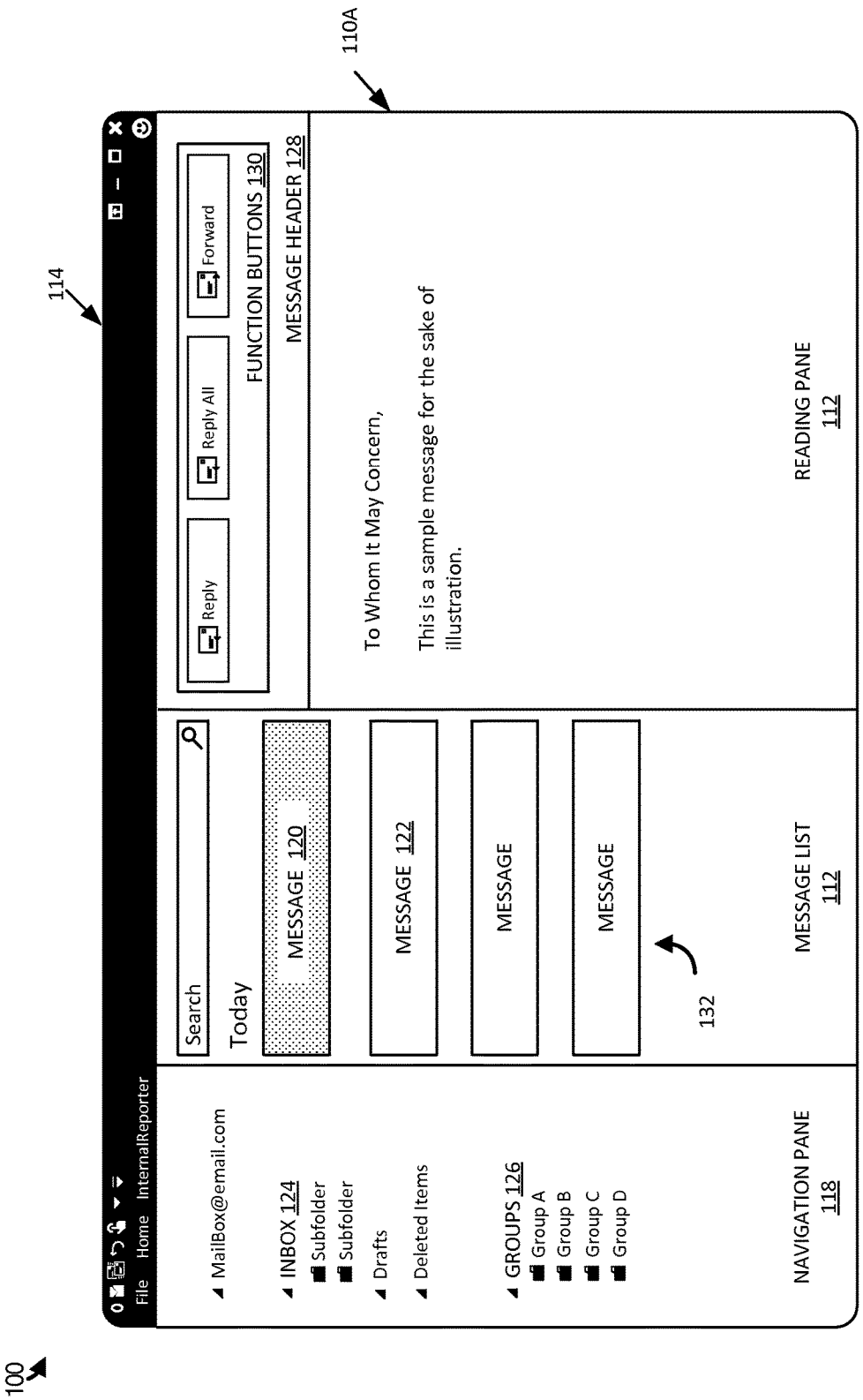
FIG. 1A illustrates one view in a progression of views of an email application, according to an example aspect.

Aspects of the disclosure are directed to differentiating a conversation scope within an email application. The email application may include a plurality of views. For example, the email application may include a personal view and a group view. The personal view may be associated with an inbox of the email application. The inbox of the email application may include a plurality of messages. In one example, the plurality of messages in the inbox include personal messages. The group view may be associated with a group and may include a plurality of messages. In one example, the plurality of messages may include group messages. In this regard, the email application may include more than one conversation scope such as a personal conversation and a group conversation. In some examples, the personal view may include at least one personal message and at least one group message.

As discussed above, current email applications may require multiple interactions from a user to track conversations, files, and meetings. For example, in a case where the email application includes multiple conversation scopes, a user may be required to search the inbox of the email application to find conversations on a specific topic (e.g., to find a personal conversation and/or to find a group conversation). In this regard, communicating (e.g., tracking conversations) via current email applications may be time consuming, inefficient, and result in a decline in productivity and/or content organization. Accordingly, aspects described herein include rendering a group header within a personal view of the email application such that a user may differentiate a conversation scope within the email application. In some cases, the group header may include a group trigger. In one example, the group trigger may facilitate conversation scope differentiation by indicating that a message in the personal view is actually a group message and part of a group conservation. In this regard, the email application of the present disclosure facilitates a compelling visual and functional experience to allow a user to quickly differentiate the scope of communications such that conversation scope differentiation is prominent and efficient.

In another example, the group trigger may be actionable. For example, a user may select the group trigger. In response to selecting the group trigger, a group view associated with a group may be rendered within the email application. A technical effect that may be appreciated is that providing a group view associated with a group within the email application simplifies the collaboration and communication process by connecting users to the people, information, and tools they need to efficiently and easily communicate and work using the email application. Additionally, the group view may include a group view header. In some examples, the group view header includes informational components. The informational components may provide group information to increase the awareness of the scope of a conversation such as whether the conversation is a public or private conversation.

As discussed above, a user may be required to search the email application and/or utilize external bookmarks to access tools associated with the email application. Searching the email application and/or utilizing external bookmarks to access tools associated with the email application may be time consuming, inefficient, and result in a decline in productivity and/or content organization. As such, in other examples, another technical effect is that the group view header includes group tools. The group tools may be readily apparent and displayed within the group view header for quick and easy access to the group tools. In one example, the group tools may provide access to a group calendar, group files, and a group notebook. In this regard, productivity between members of a group may be increased by giving members of a group quick access to interactive group tools for communicating, collaborating on files, scheduling meetings, managing members of the group, and the like. Furthermore, as described herein, the group view and group view header improve group content (e.g., messages, meetings, files, notebooks, etc.) discoverability and organization.

Referring now to the drawings, in which like numerals represent like elements through the several figures, aspects of the present disclosure and the exemplary operating environment will be described. With reference to FIG. 1A, one view 110A in a progression of views of an email application 100 is illustrated. Email application 100 may be any application or collection of applications, module or collection of modules, service or services, or any variation or combination thereof capable of facilitating sharing of content, communication, collaboration, conversations, and the like. Examples of the email application 100 include Microsoft® Outlook®, Outlook® Web App, Mobile Outlook®, Hotmail®, Outlook.com, and Gmail, as well as any other email application.

Figure 7:
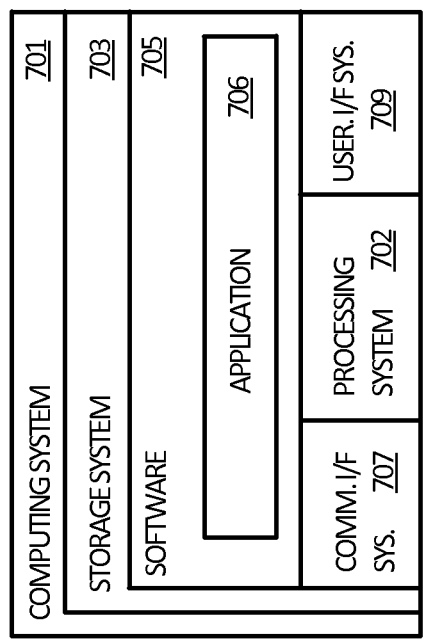
FIG. 7 illustrates a computing system suitable for implementing the enhanced email technology disclosed herein, including any of the environments, architectures, elements, processes, user interfaces, and operational scenarios and sequences illustrated in the Figures and discussed below in the Technical Disclosure.

In aspects, the email application 100 may be implemented on a client computing device (e.g., such as the computing device illustrated in FIG. 7). In a basic configuration, the client computing device is a handheld computer having both input elements and output elements. The client computing device may be any suitable computing device for implementing the email application 100 for differentiating a conversation scope within the email application 100. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the email application 100 for differentiating a conversation scope within the email application 100 may be utilized.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In aspects, the view 110A of the email application 100 is one example of a view a user may encounter when interacting with the email application 100. In one example, the view 110A is a personal view. The personal view may be any view of email application 100 that is presently active and displayed. For example, the personal view may include personal messages such as those messages associated with the inbox of the email application 100. For purposes of the discussion herein relative to view 110A, view 110A will be described as a personal view. In one example, the view 110A may include a ribbon 114, a navigation pane 118, a message list 112, a reading pane 116, and a message header 128. The various components described herein may be implemented using hardware, software, or a combination of hardware and software. The ribbon 114 is a graphical control element within email application 100 that includes a set of toolbars in the form of several tabs, for example. The navigation pane 118 includes contents and options for activating various modules, services, and/or applications that are part of the email application 100. For example, the navigation pane 118 may include options for activating mail, calendars, tasks, contacts, notes, folders, and the like. In one example, the navigation pane 118 may include a plurality of folders. As illustrated in FIG. 1A, the navigation pane 118 includes an inbox folder 124 and a groups folder 126, among other folders. In some cases, the inbox folder 124 may include subfolders. The groups folder 126 may include a list of groups associated with a user of the email application 100. A group may include a set of people who meet and/or do things together because they share the same purpose or ideas. For example, a group may include all the people working on the same project in a company. In another example, a group may include people who are interested in organic food and a healthy lifestyle. In this regard, the groups folder 126 may include a list of groups that are of interest to a user of the email application 100.

In one case, when the inbox folder 124 is selected, a plurality of messages 132 associated with the inbox folder 124 may be rendered and displayed within the message list 112 of the email application 100. In one example, the message list 112 includes at least one personal message 120 and one group message 122. In one case, when the personal message 120 is selected (as illustrated), the view 110A is rendered within email application 100. In another case, the view 110A is rendered within email application 100 when the inbox folder 124 is selected. It is appreciated that the view 110A may be rendered within email application 100 upon selection of any folder, service, module, application, etc., within email application 100. In some cases, when the personal message 120 is selected (as illustrated), contents associated with the selected personal message 120 may be displayed in reading pane 116. In this regard, the reading pane 116 may include contents associated with a selected message from the plurality of messages in the message list 112.

In aspects, the message header 128 may include information associated a selected message from the plurality of messages in the message list 112. For example, the information associated with a selection message may include the date, time, subject, sender, receiver, and the like. In one example, the message header 128 includes the function buttons 130. In one example, and as illustrated, the function buttons 130 may include a reply button, a reply all button, and a forward button.

In one example, the email application 100 may be implemented as a user interface component. In one case, the user interface component may be a touchable user interface that is capable of receiving input via contact with a screen of the client computing device, thereby functioning as both an input device and an output device. For example, content may be displayed, or output, on the screen of the client computing device and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device, thereby functioning as both an input device and an output device. For example, content may be displayed, or output, on the screen of the client computing device and input may be received by contacting the screen using a cursor, for example. In this regard, contact may include, for example, placing a cursor on the non-touchable user interface using a device such as a mouse.

Figure 1B:
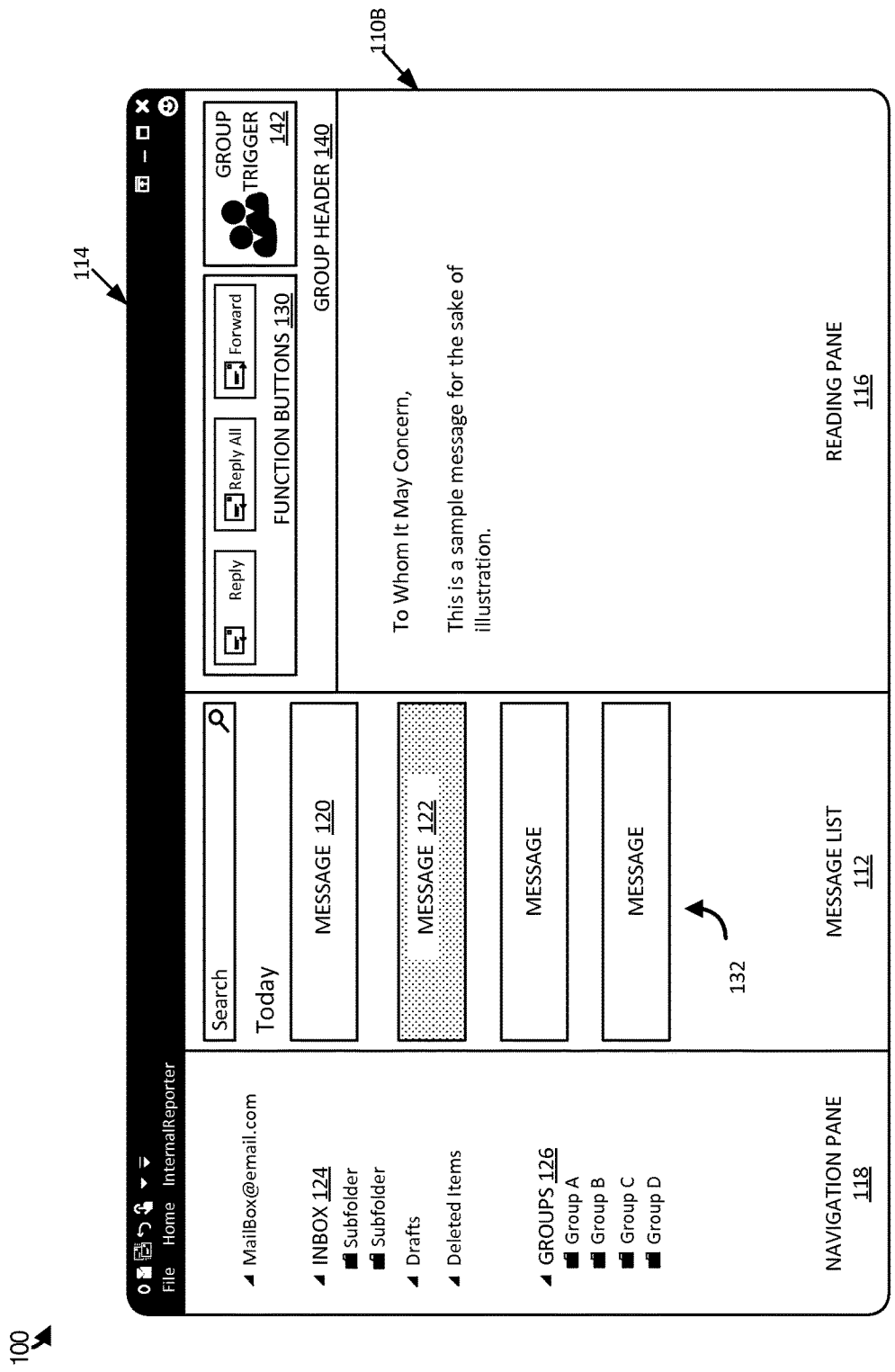
FIG. 1B illustrates another view in the progression of views of the email application of FIG. 1A, according to an example aspect.

FIG. 1B illustrates another view 110B in the progression of views of the email application 100. As discussed above, email application 100 may be any application or collection of applications, module or collection of modules, service or services, or any variation or combination thereof capable of facilitating sharing of content, communication, collaboration, conversations, and the like. The view 110B of the email application 100 is another example of a view a user may encounter when interacting with the email application 100. In one example, the view 110B is a personal view. The personal view may be any view of email application 100 that is presently active and displayed. For purposes of the discussion herein relative to view 110B, view 110B will be described as a personal view. In one example, similar to the view 110A of the email application 100, the view 110B may include a ribbon 114, a navigation pane 118, a message list 112, and a reading pane 116. The view 110B may further include a group header 140. The navigation pane 118 may include an inbox folder 124 and a groups folder 126, among other folders.

In aspects, similar to the view 110A of the email application 100, when the inbox folder 124 is selected, a plurality of messages 132 associated with the inbox folder 124 may be rendered and displayed within the message list 112 of the email application 100. In one example, the message list 112 includes at least one personal message 120 and one group message 122. The group message 122 may be associated with and belong to a group, as discussed herein. In one case, when the group message 122 is selected (as illustrated), the view 110B is rendered within email application 100. In some cases, when the group message 122 is selected (as illustrated), contents associated with the selected group message 122 may be displayed in reading pane 116.

In one example, the group header 140 includes the function buttons 130. In another example, the group header 140 may include a group trigger 142. In this regard, as discussed herein, the view 110B allows a user to differentiate a conversation scope within the email application 100. For example, while in a personal view (e.g., an inbox of the user), a user may select the group message 122 from the plurality of messages and determine that the selected group message 122 is a group message (e.g., belongs to a group) based on the rendering of the group header 140 within the email application 100. In this regard, the group header 140 creates a visually compelling experience that enables a user to determine whether a message is part of a personal conversation or part of a larger group conversation. In aspects, the group header 140 may be disabled. In one example, a disable option (not illustrated) may be selected for disabling the group header 140.

In one example, the group trigger 142 may be an option within the view 110B for initiating rendering of a group view within the email application 100. The group view may be associated with the selected group message 122. For example, the selected group message 122 may be a message that belongs to a particular group (e.g., that is part of a group conversation). As such, in response to a selection of the group trigger 142, a group view associated with a particular group may be rendered within the email application 100. In this regard, a user may go from experiencing a personal conversation to experiencing a group conversation by activating the group trigger 142. In one case, the group trigger 142 may comprise a group description and/or a button to initiate rendering of the group view associated with the group, which will be described below relative to FIG. 2A. In another case, the group trigger 142 may comprise a group list to select from a list of groups to initiate rendering of a group view of a selected group from the group list, which will be described below relative to FIG. 2B.

Figure 1C:
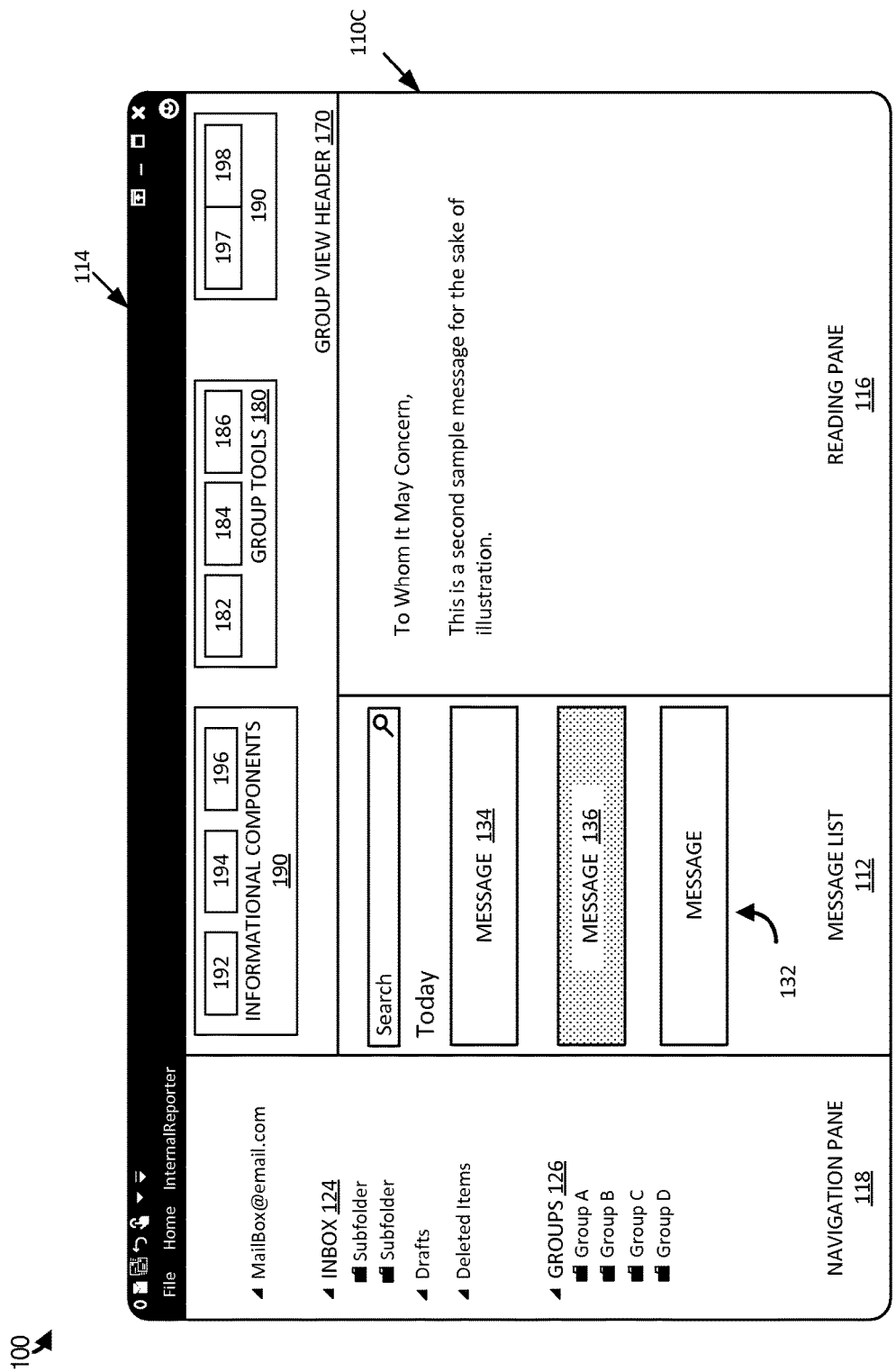
FIG. 1C illustrates another view in the progression of views of the email application of FIG. 1A, according to an example aspect.

FIG. 1C illustrates another view 110C in the progression of views of the email application 100. As discussed above, email application 100 may be any application or collection of applications, module or collection of modules, service or services, or any variation or combination thereof capable of facilitating sharing of content, communication, collaboration, conversations, and the like. The view 110C of the email application 100 is another example of a view a user may encounter when interacting with the email application 100. In one example, the view 110C is a group view. For example, in response to a selection of the group trigger 142 (as illustrated in FIG. 1B), the view 110C may be rendered within the email application 100. For purposes of the discussion herein relative to view 110C, view 110C will be described as a group view. The group view may be any view of email application 100 that is presently active and displayed. As discussed above, the group view may be associated with a group. In this regard, the group view may facilitate engagement with and access to a group. For example, the group view provides tools to efficiently communicate, collaborate, work, and engage with group members and to efficiently interact with, discover, and organize group content.

In one example, similar to the views 110A and 110B of the email application 100, the view 110C may include a ribbon 114, a navigation pane 118, a message list 112, and a reading pane 116. The view 110C may further include a group view header 170. The navigation pane 118 may include an inbox folder 124 and a groups folder 126, among other folders. In one example, when the groups folder 126 is selected (or any subset of folders within groups folder 126), the view 110C is rendered within the email application 100. As such, the view 110C may be rendered within the email application 100 in response to a selection of the group folder 126 and/or in response to a selection of the group trigger 142 while in a personal view (e.g., such as view 110B). When the view 110C is rendered within the email application 100, the message list 112 may include a plurality of group messages 134 associated with the selected group. In some cases, when a group message from the plurality of group messages 134 is selected (as illustrated), contents associated with the selected group message may be displayed in reading pane 116.

In one example, as illustrated in FIG. 1C, the group view header 170 may be located above the message list 112 and the reading pane 116. In another example, the group view header 170 may be located within the reading pane 116. It is appreciated that the group view header 170 may be rendered at any location within the email application 100 suitable for a user to easily notice the group view header 170 and efficiently access the group view header 170. The group view header 170 may include one or more group tools 180 and one or more informational components 190. The one or more group tools 180 may increase productivity within a group view (e.g., the view 110C). For example, the one or more group tools 180 may be readily apparent and displayed within the group view header 170 for quick and easy access to the one or more group tools 180. In one example, the one or more group tools 180 may include a calendar trigger 182, a file trigger 184, and a notebook trigger 186, which will be described in more detail below relative to FIG. 3A. In this regard, the one or more group tools 180 may facilitate communication, collaboration (e.g., on files), scheduling meetings, managing members, and the like. In turn, productivity between members of a group may be increased. In some cases, when any of the one or more group tools 180 is triggered, the view 110C remains rendered within the email application 100. For example, a user may select and trigger any of the one or more group tools 180 without leaving the group view.

The one or more informational components 190 may increase the awareness of the scope of a conversation, give context to a conversation, and provide group information at a glance. For example, the one or more informational components 190 may include a group profile image 192, a group description 194, a participation status 196, a group members preview 197, and a group member list option 198, which will be described in more detail below relative to FIG. 3A. In one example, the group description 194 may include a group name and a group privacy indicator. The group privacy indicator may indicate whether a group is a private group or a public group and/or whether a conversation is a public conversation or private conversation.

Figure 2A:
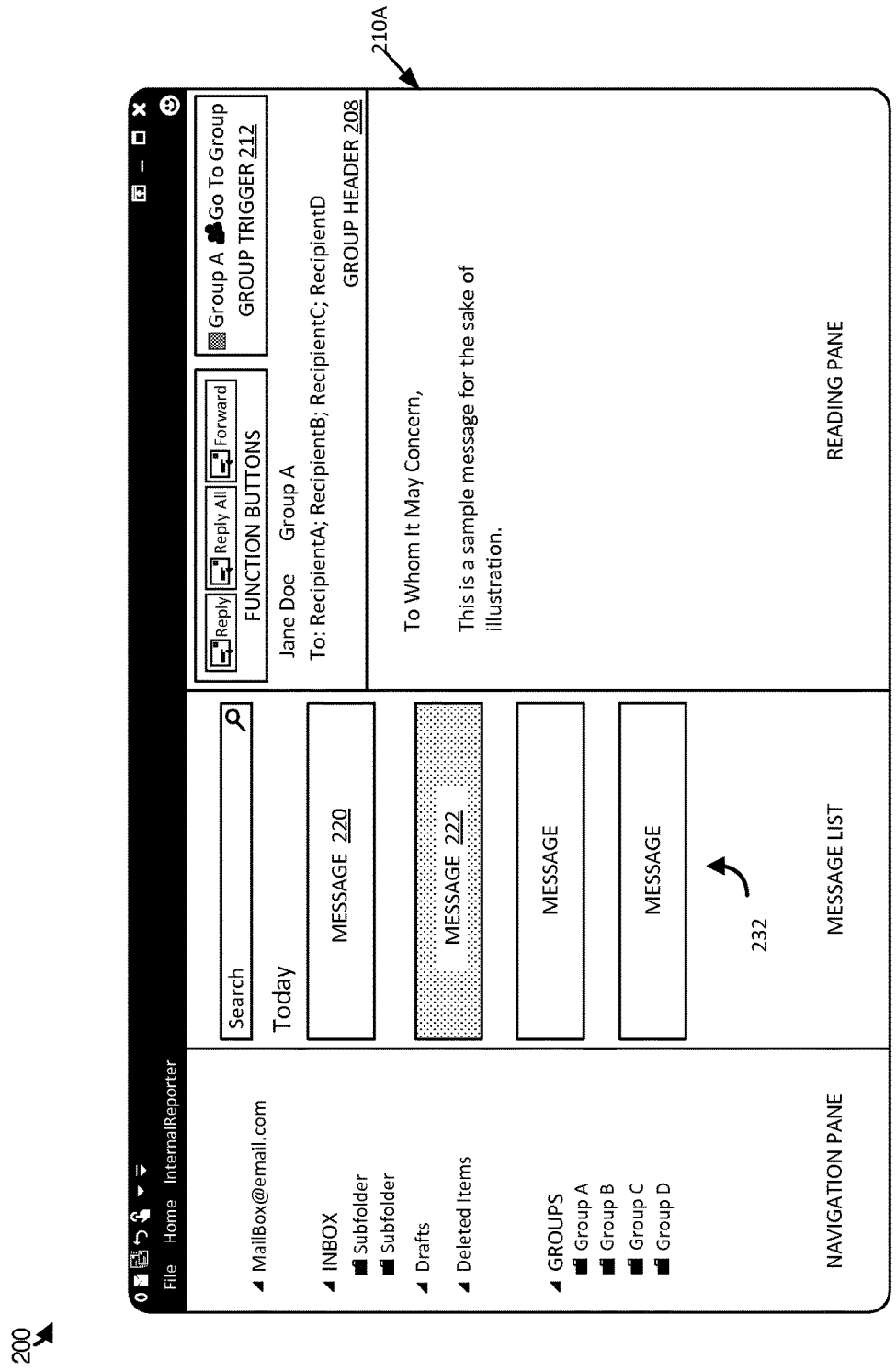
FIG. 2A illustrates one view in a progression of views of an email application, according to an example aspect.

FIG. 2A illustrates one view 210A in a progression of views of an email application 200. Similar to email application 100, email application 200 may be any application or collection of applications, module or collection of modules, service or services, or any variation or combination thereof capable of facilitating sharing of content, communication, collaboration, conversations, and the like. The view 210A of the email application 200 is an example of a view a user may encounter when interacting with the email application 200. In one example, the view 210A is a personal view. The personal view may be any view of email application 200 that is presently active and displayed. For purposes of the discussion herein relative to view 210A, view 210A will be described as a personal view. In one example, the view 210A may include a plurality of messages 232, a group header 208, and a group trigger 212, among other components. The plurality of messages 232 include at least one personal message 220 and at least one group message 222.

The at least one group message 222 may be associated with and belong to a group, as discussed herein. In some cases, the group message 222 may be associated with one group. In other cases, the group message 222 may be associated with a plurality of groups. In one example, when the group message 222 is selected (as illustrated), the view 210A is rendered within email application 200. In this regard, as discussed herein, the view 210A allows a user to differentiate a conversation scope within the email application 200. For example, the group trigger 212 may include an option for initiating rendering of a group view within the email application 200. In one example, when the group message 222 is associated with one group, the group trigger 212 includes a group profile image, a group description, and an option (e.g., a button) for initiating rendering of the group view associated with the selected group message 222. As illustrated in FIG. 2A, the group description includes a group name, "Group A," and the option for initiating rendering of the group view associated with the selected group message 222 includes a "Go To Group" button. As such, in response to a selection of the group trigger 212 (e.g., the "Go To Group" button), a group view associated with Group A may be rendered within the email application 200. In this regard, a user may go from experiencing a personal conversation to experiencing a group conversation by selecting (e.g., activating) the group trigger 212 and/or the "Go To Group" button.

Figure 2B:
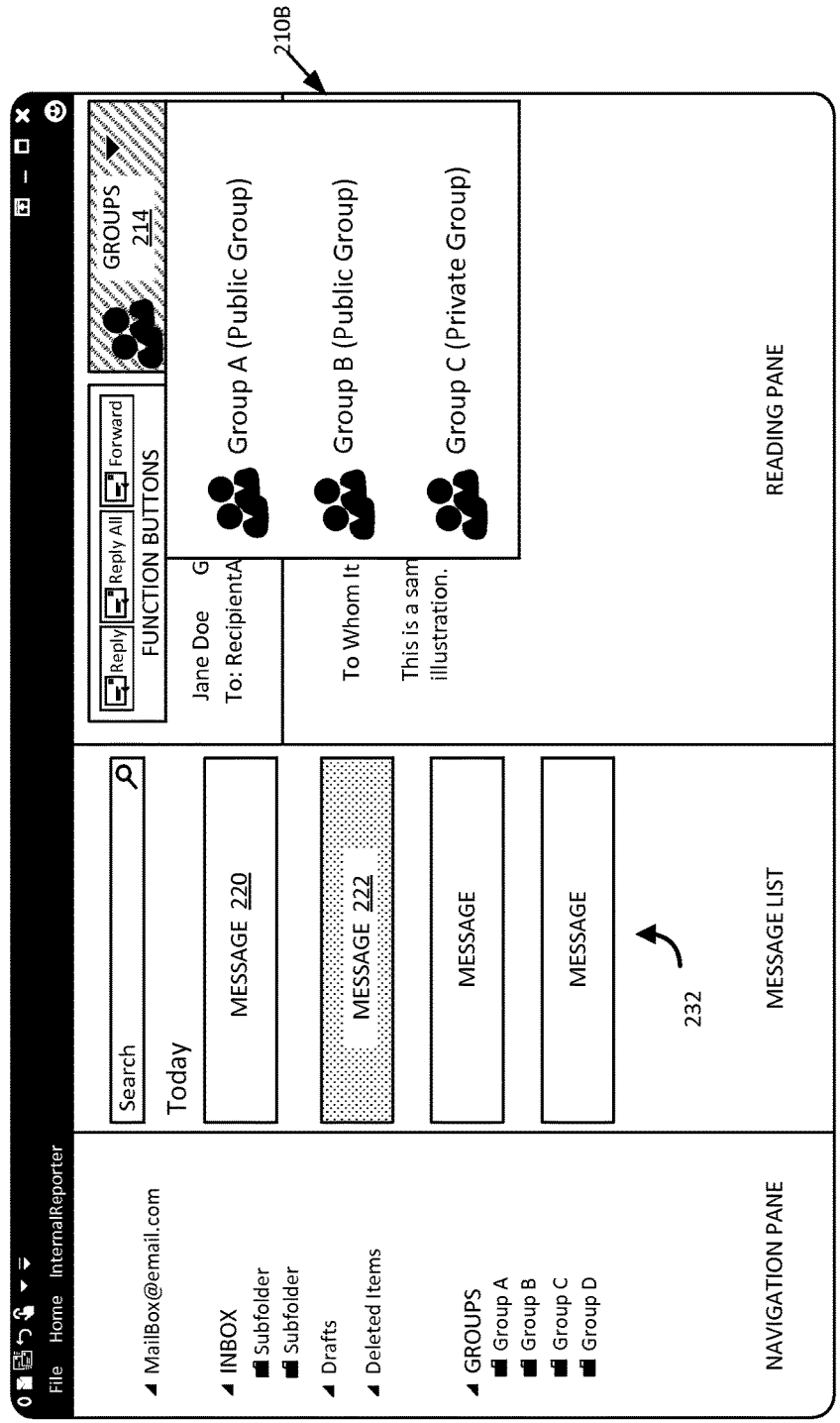
FIG. 2B illustrates another view in the progression of views of the email application of FIG. 2A, according to an example aspect.

FIG. 2B illustrates another view 210B in a progression of views of the email application 200. The view 210B of the email application 200 is an example of a view a user may encounter when interacting with the email application 200. In one example, the view 210B is a personal view. The personal view may be any view of email application 200 that is presently active and displayed. For purposes of the discussion herein relative to view 210B, view 210B will be described as a personal view. In one example, the view 210B may include a plurality of messages 232 and a group trigger 214, among other components. The plurality of messages 232 include at least one personal message 220 and at least one group message 222.

The at least one group message 222 may be associated with and belong to a group, as discussed herein. In one example, when the group message 222 is selected (as illustrated), the view 210B is rendered within email application 200. In this regard, as discussed herein, the view 210B allows a user to differentiate a conversation scope within the email application 200. For example, the group trigger 214 may include an option for initiating rendering of a group view within the email application 200. In one example, when the group message 222 is associated with a plurality of groups, in response to a selection of the group trigger 214, a group list is activated and displayed for initiating rendering of a group view associated with the selected group message 222. The group message 222 may be associated with a plurality of groups when the group message 222 is sent to the plurality of groups. For example, if a user sends a message to three groups, the message will be associated with those three groups. As illustrated in FIG. 2B, the group list includes "Group A," "Group B," and "Group C." In this regard, the selected message 222 is associated with three groups, "Group A," "Group B," and "Group C." This group list is exemplary only and should not be considered as limiting. It is appreciated that a group message may be associated with any number of groups and that the group list may include any number of groups associated with a group message. In one example, in response to a selection of "Group A," a group view associated with Group A may be rendered within the email application 200. In another example, in response to a selection of "Group B," a group view associated with Group B may be rendered within the email application 200. In yet another example, in response to a selection of "Group C," a group view associated with Group C may be rendered within the email application 200. In this regard, a user may go from experiencing a personal conversation to experiencing a group conversation by selecting (e.g., activating) the group trigger 214 and selecting a desired group from the group list.

Figure 3A:
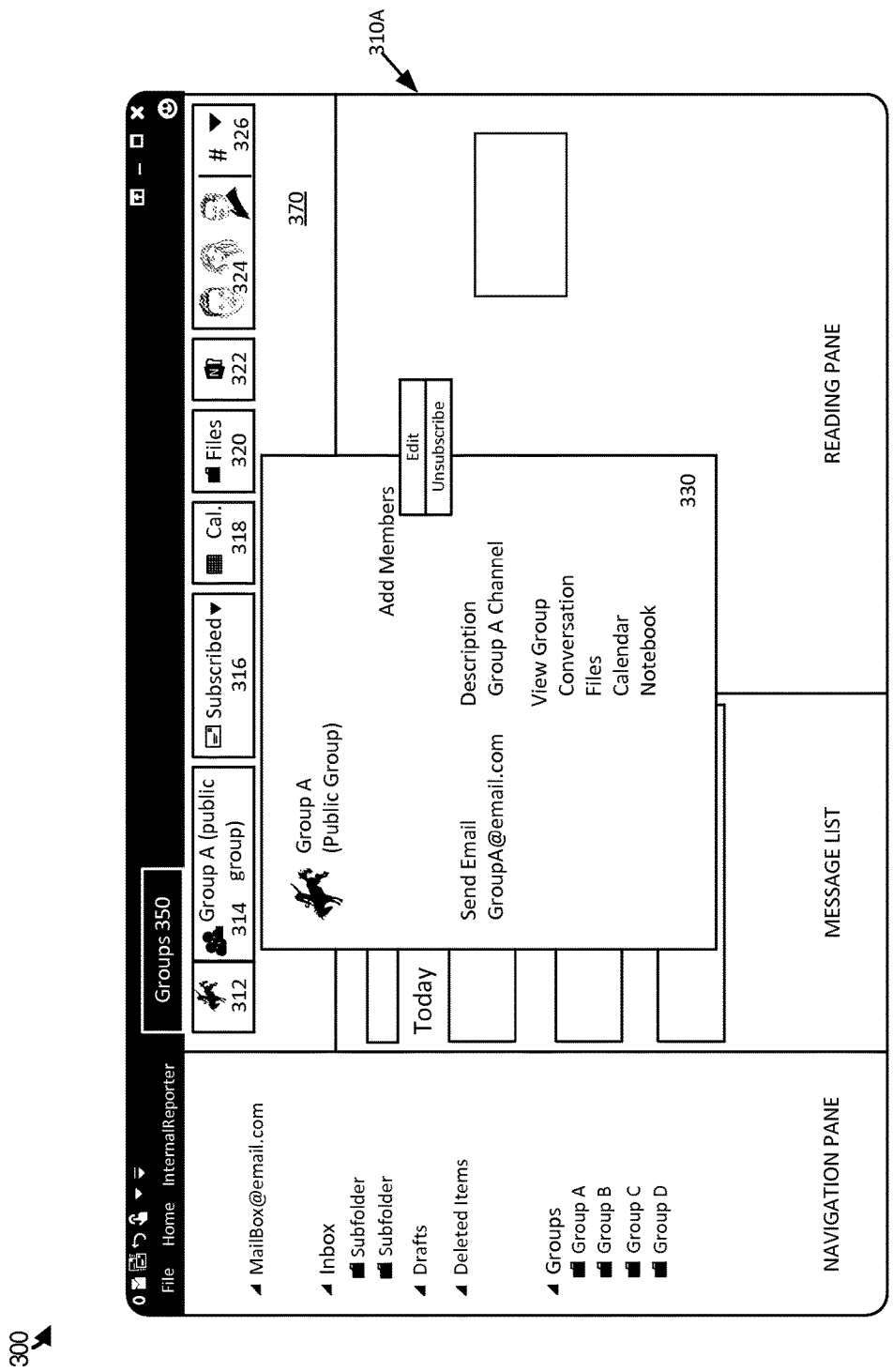
FIG. 3A illustrates one view in a progression of views of an email application, according to an example aspect.

FIG. 3A illustrates one view 310A in a progression of views of an email application 300. Similar to email applications 100 and 200, email application 300 may be any application or collection of applications, module or collection of modules, service or services, or any variation or combination thereof capable of facilitating sharing of content, communication, collaboration, conversations, and the like. The view 310A of the email application 300 is an example of a view a user may encounter when interacting with the email application 300. In one example, the view 310A is a group view. The group view may be any view of email application 300 that is presently active and displayed. For purposes of the discussion herein relative to view 310A, view 310A will be described as a group view. In one example, the view 310A may include a group view header 370. In one aspect, the group view header 370 includes a group profile image 312, a group description 314, a participation status 316, a calendar trigger 318, a file trigger 320, a notebook trigger 322, a group members preview 324, and a group member list option 326.

The group profile image 312 may be any image sufficient to identify the group associated with the group view (e.g., in this case, the view 310A). In one case, an administrator of the group may set the group profile image 312. The administrator of the group may be the person who created the group. In one example, the group description 314 may include a group name and a group privacy indicator. In the example shown in FIG. 3A, the group name is "Group A." The group privacy indicator may indicate whether a group is a private group or a public group and/or whether a conversation is a public conversation or private conversation. For example, as shown in FIG. 3A, "Group A" is a public group. A public group is open to everyone. For example, any user of the email application 300 may discover, join, and/or subscribe to a public group. In one example, a user of the email application 300 may join and/or subscribe to a public group by receiving approval from the group administrator. A private group is exclusive and only open to its members. In one case, any user of the email application 300 may see a private group name and send messages to and receive messages from a private group. However, the content and conversations within a private group are secure and not viewable by any user of the email application 300. In one example, a user of the email application 300 may join and/or subscribe to a private group by receiving approval from the private group administrator.

In one case, as illustrated in FIG. 3A, in response to an indication of interest of at least one of the group profile image 312 and the group description 314, a group card 330 is displayed within the email application 300. The indication of interest may include any of a hover, click, selection, and the like of at least one of the group profile image 312 and the group description 314. The group card 330 may include information about the group (e.g., Group A) including, but not limited to, the group email address, a group description, access to the group tools (e.g., conversations, files, calendar, and notebook), and an option to add members, edit members, and/or change a user participation status.

The participation status 316 is a dynamic identifier of the group membership level for the user that triggered the group view. The participation status 316 allows a user of the email application 300 to join, subscribe, unsubscribe, and leave a group, which will be described in more detail below relative to FIGS. 4A and 4B. In the example shown in FIG. 3A, the participation status 316 is subscribed. The calendar trigger 318 may provide access to the group calendar within the email application 300. For example, in response to a selection of the calendar trigger 318, a calendar associated with the group may be rendered within the email application 300. A user may easily view any meetings, activities, events, and the like, associated with the group. In this regard, members of the group may easily and efficiently coordinate their schedules. When a user of the email application 300 is a member of more than one group, the user may view the group calendar for each group side-by-side. The file trigger 320 may provide access to files associated with the group. For example, in response to a selection of the file trigger 320, a list of files associated with the group may be rendered within the email application 300. In one example, a cloud storage service such as OneDrive® may be opened in response to a selection of the file trigger 320. Any files associated with the group may be stored on the cloud storage service. In this regard, members of the group can easily access, view, edit, and collaborate within the files associated with the group.

The notebook trigger 322 may provide access to a notebook associated with the group. For example, in response to a selection of the notebook trigger 322, a notebook associated with the group may be opened within the email application 300. In this regard, members of the group can easily access, view, edit, and share notes associated with the group. The group members preview 324 displays one or more group member profile pictures. In some cases, the group members preview 324 includes the profile pictures of the most active members of the group. In some case, the group members preview 324 includes the profile pictures of the top five most active members of the group. In this regard, users of the email application 300 may quickly view the group members preview 324 to determine whether they have an interest in joining and/or subscribing to a group. For example, a user may recognize four of the five top active members of the group and decide they want to join the group.

Figure 3B:
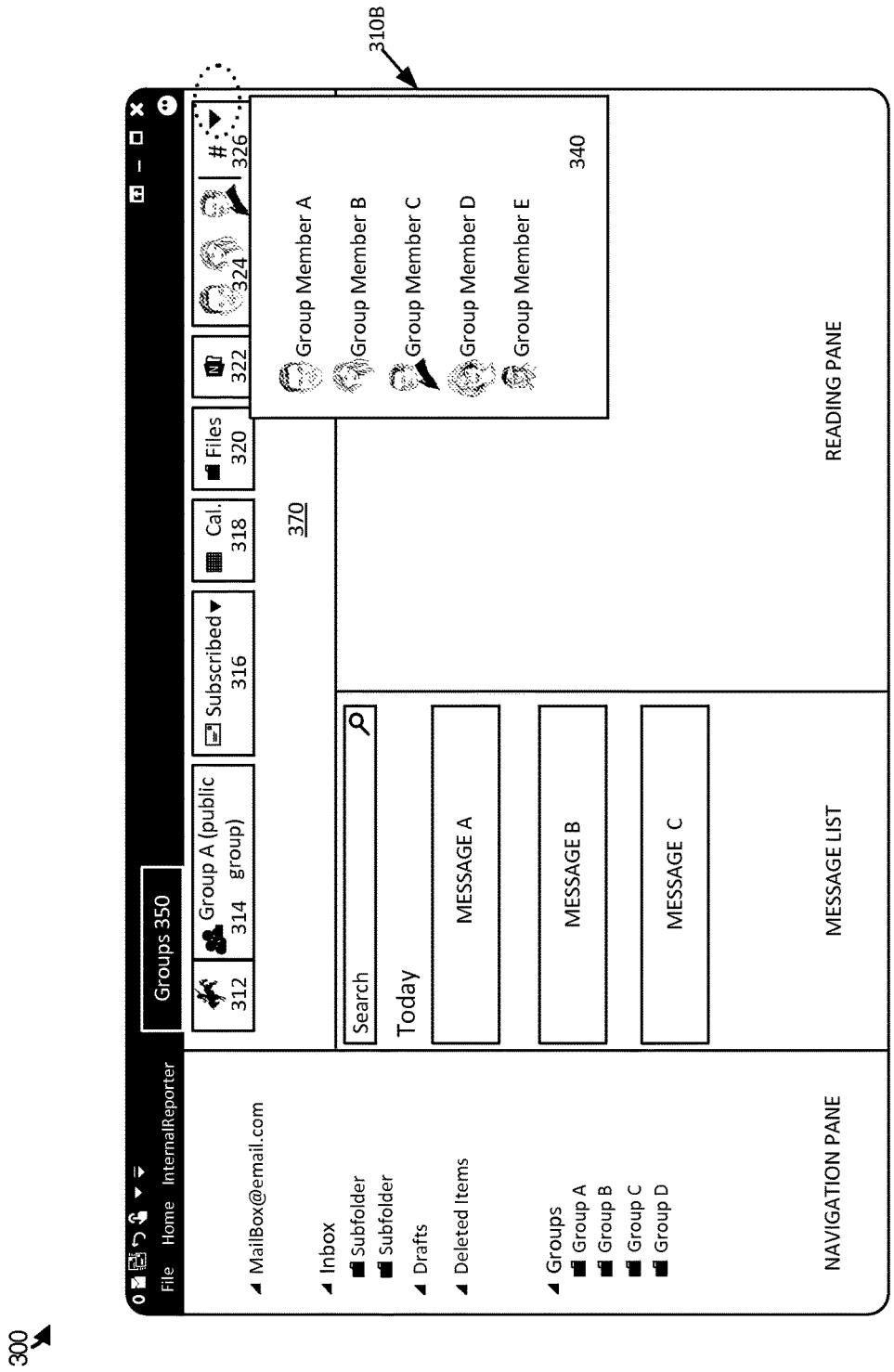
FIG. 3B illustrates another view in a progression of views of the email application of FIG. 3A, according to an example aspect.

The group member list option 326 may include a list of the group members. With reference now to FIG. 3B, in one example, the group member list 326 may be activated to display a list of the group members 340. For example, in response to a selection of the group member list option 326, a list of group members 340 may be rendered within the email application 300. FIG. 3B illustrates another view 310B in a progression of views of the email application 300. The view 310B of the email application 300 is an example of a view a user may encounter when interacting with the email application 300. In one example, the view 310B is a group view. The view 310B includes the group view header 370 including the group profile image 312, the group description 314, the participation status 316, the calendar trigger 318, the file trigger 320, the notebook trigger 322, the group members preview 324, and the group member list option 326. As shown in FIG. 3B, the list of group members 340 includes group member A, group member B, group member C, group member D, and group member E. As such, in this example, Group A includes five members. It is appreciated that a group may include any number of group members. The number of group members may be displayed between the group members preview 324 and the group member list option 326, which is illustrated in FIGS. 3A and 3B by the "#" icon.

In aspects, the views 310A and 310B may include a groups tab 350. In some cases, the groups tab 350 may be included in a ribbon (e.g., the ribbon 114 as illustrated in FIGS. 1A-1C) of the email application 300. In some cases, the views 310A and 310B may be rendered within email application 300 in response to a selection of the groups tab 350. As such, a group view, such as those illustrated in FIGS. 1C, 3A, and 3B, may be rendered within an email application in response to a selection of the groups tab 350, in response to a selection of the group folder 126 (e.g., as illustrated in FIGS. 1A and 1B) and/or in response to a selection of the group trigger 142 while in a personal view (e.g., such as view 110B). In one example, the groups tab 350 may be highlighted when a group view is rendered within an email application. In some cases, the groups tab 350 may provide a disable option to disable the group view header 370. In some cases, the disable option may be provided within an options module of the email application 300.

Figure 4A:
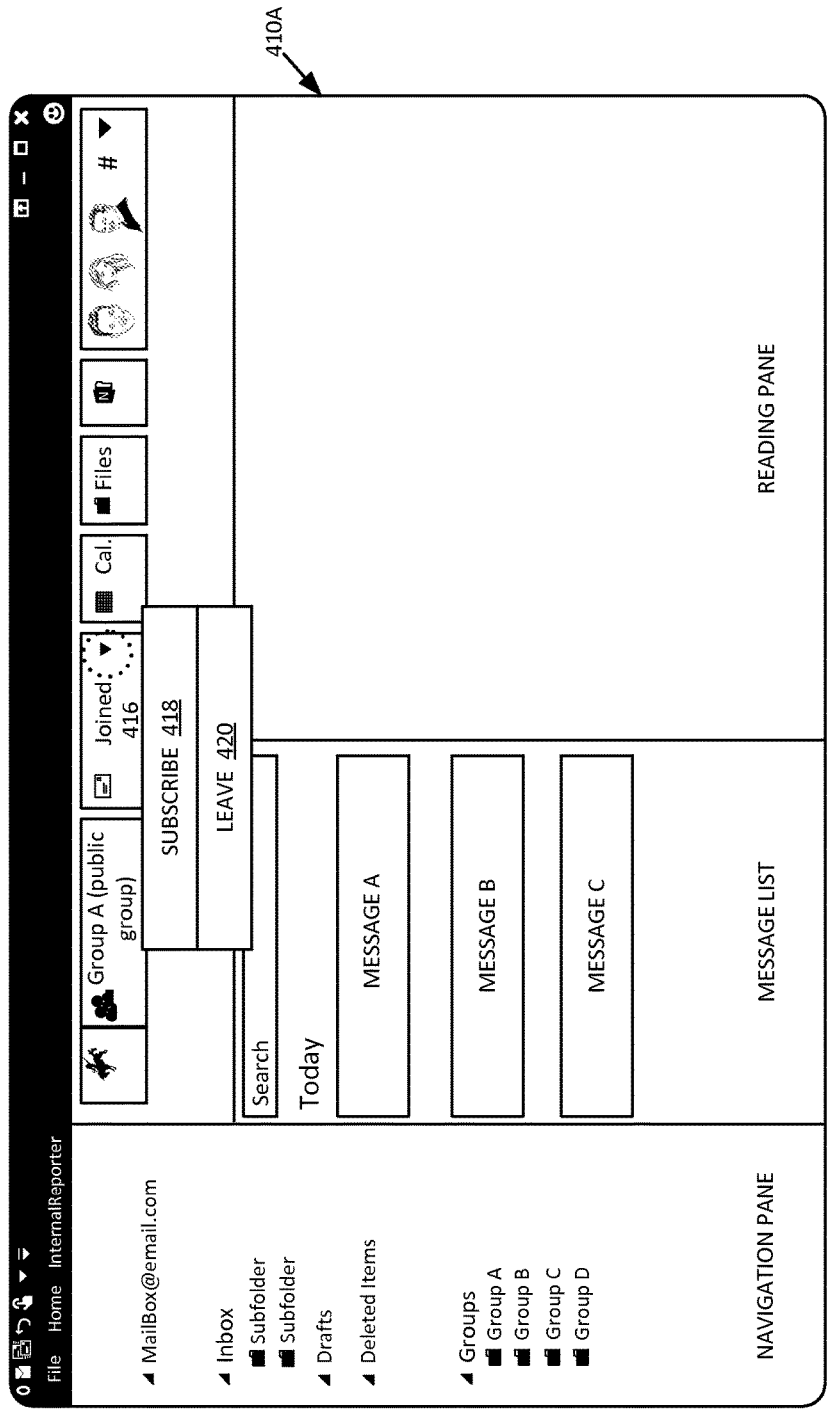
FIG. 4A illustrates one view in a progression of views of an email application, according to an example aspect.

FIG. 4A illustrates one view 410A in a progression of views of an email application 400. Similar to email applications 100, 200, and 300, the email application 400 may be any application or collection of applications, module or collection of modules, service or services, or any variation or combination thereof capable of facilitating sharing of content, communication, collaboration, conversations, and the like. The view 410A of the email application 400 is an example of a view a user may encounter when interacting with the email application 400. In one example, the view 410A is a group view. The group view may be any view of email application 400 that is presently active and displayed. In one example, the view 410A may include a participation status 416, among other components.

As discussed above, a participation status allows a user of an email application to join, subscribe, unsubscribe, and leave a group. The participation status 416 shown in FIG. 4A is joined. As discussed above, a user of the email application 400 may join a group by sending a request to an administrator and receiving approval from the group administrator.

In this regard, a request to join option (not illustrated) may be presented within the email application 400. In one example, before a user has joined a group, the user may receive a group message in her personal inbox by a member of the group mentioning the user during a group conversation. As such, in one aspect, the request to join option is displayed in the group header (e.g., group header 140) while in a personal view (e.g., the view 110B). In another aspect, the request to join option is displayed in the group view header (e.g., group view header 370) while in a group view (e.g., the view 310A). In this regard, when the group is a public group, a user may go to the group view and view the group content before joining the group. When the group is a private group, a user must join the group before having access to the group view and group content.

A joined participation status (e.g., such as the participation status 416) gives a user access to the group content of the group that the user has joined. In other words, the user becomes a member of the group when the user joins a group. In one example, when a member of a group has a joined participation status, the member may access the group view and the group content via the groups folder 126 in the navigation pane 118, as described herein relative to FIGS. 1A-1C. In another example, when a member of a group has a joined participation status, the member may access the group view and the group content via the groups tab 350, as described herein relative to FIGS. 3A-3B. However, if a member of a group wants to receive group conversations and events, for example, in her inbox, a subscribe participation status is required. As such, in response to a selection of the participation status 416, a list of one or more participation status options may be displayed within the email application 400.

As illustrated in FIG. 4A, the list includes a subscribe participation status 418 and a leave participation status 420. The subscribe participation status 418 gives a user access to the group content of the group that the user has subscribed to and indicates that a user has requested to receive group conversations, messages, events, and the like in the inbox of the subscribed user. For example, when a member of a group is subscribed to the group, the member will receive group messages in her personal inbox, as described herein relative to FIGS. 1A-1C. In this regard, a subscribed member may stay up-to-date on group activities and conversations. The leave participation status 420 allows a member of a group to leave the group. As such, when a user selects the leave participation status 420, the user will no longer have access to a private group and will no longer receive group conversations, messages, events, and the like, in her inbox.

Figure 4B:
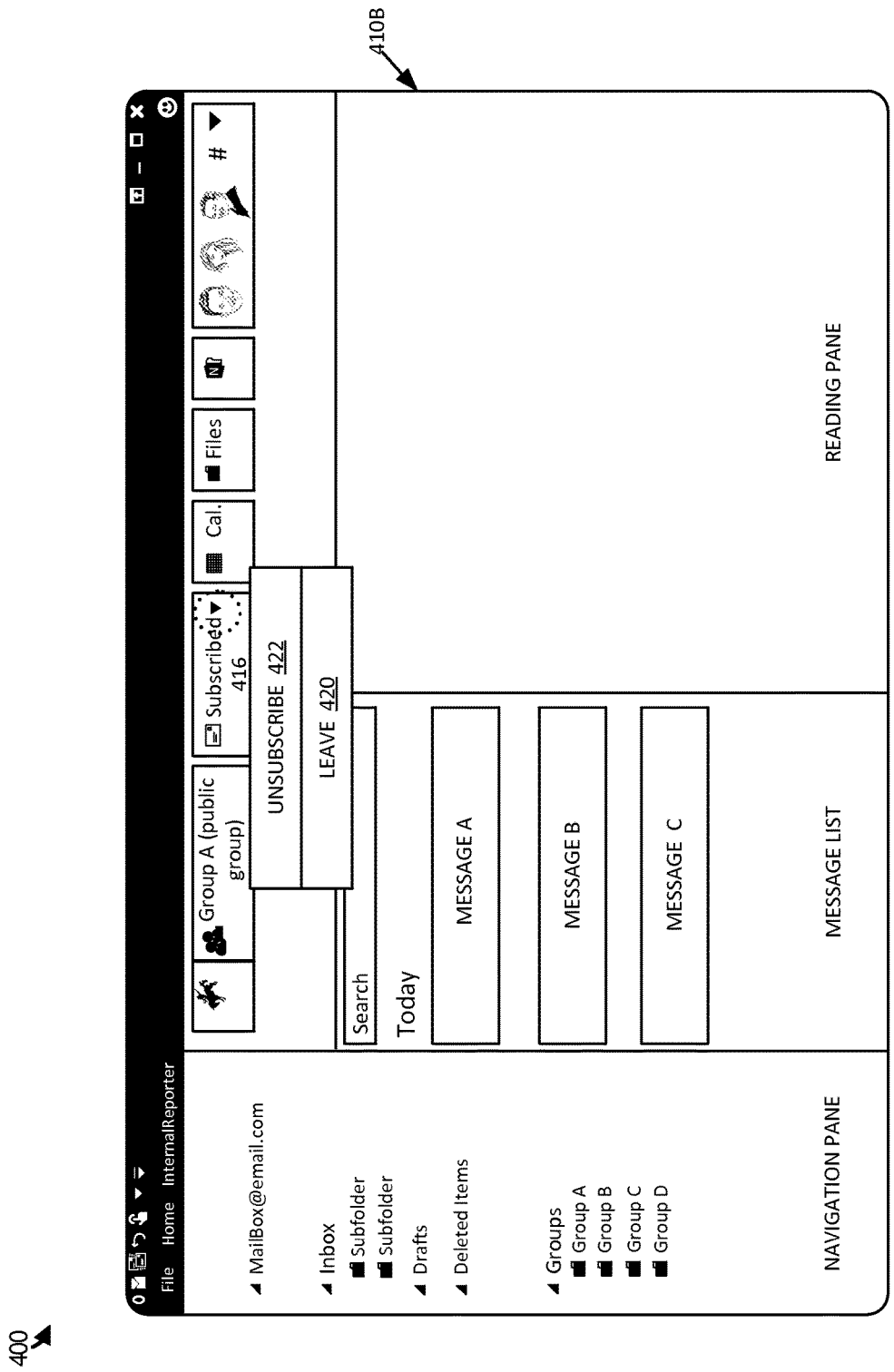
FIG. 4B illustrates another view in a progression of views of the email application of FIG. 4A, according to an example aspect.

FIG. 4B illustrates another view 410B in a progression of views of the email application 400. The view 410B of the email application 400 is an example of a view a user may encounter when interacting with the email application 400. In one example, the view 410B is a group view. The group view may be any view of email application 400 that is presently active and displayed. In one example, the view 410B may include the participation status 416, among other components. The participation status 416 shown in FIG. 4B is subscribed. As discussed above, a user of the email application 400 may subscribe to a group by sending a request to an administrator and receiving approval from the group administrator. In this regard, a request to subscribe option (e.g., participation status 418) may be presented within the email application 400. In one example, before a user has subscribed to a group, the user may receive a group message in her personal inbox by a member of the group mentioning the user during a group conversation. As such, in one aspect, a request to subscribe option is displayed in the group header (e.g., group header 140) while in a personal view (e.g., the view 110B). In another aspect, the request to subscribe option is displayed in the group view header (e.g., group view header 370) while in a group view (e.g., the view 310A).

As discussed above, a subscribe participation status gives a user access to the group content of the group that the user has subscribed to and indicates that a user has requested to receive group conversations, messages, events, and the like in the inbox of the subscribed user. In one example, in response to a selection of the participation status 416, a list of one or more participation status options may be displayed within the email application 400. As illustrated in FIG. 4B, the list includes an unsubscribe participation status 422 and a leave participation status 420. The unsubscribe participation status 422 allows a subscribed member of a group to unsubscribe from the group. In this regard, a member of a group may unsubscribe from a group (e.g., to stop receiving group messages in her inbox) and still have a joined participation status. As such, even when a user unsubscribes from a group, the user may still enjoy access to the group. As discussed above, the leave participation status 420 allows a member of a group to leave the group. As such, when a user selects the leave participation status 420, the user will no longer have access to a private group and will no longer receive group conversations, messages, events, and the like, in her inbox.

Figure 5:
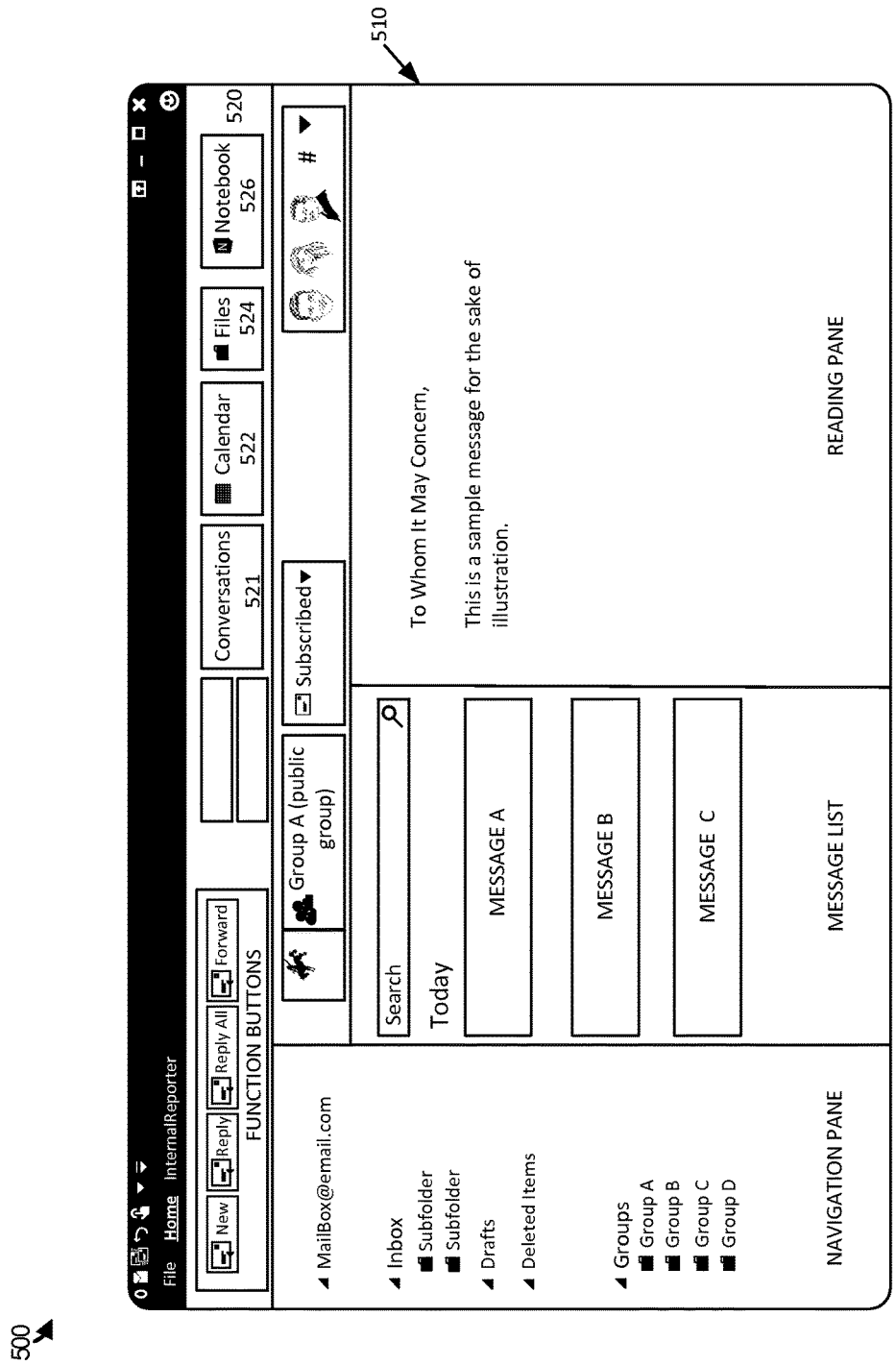
FIG. 5 illustrates one view in a progression of views of an email application, according to an example aspect.

FIG. 5 illustrates one view 510 an email application 500. Similar to email applications 100, 200, 300, and 400, email application 500 may be any application or collection of applications, module or collection of modules, service or services, or any variation or combination thereof capable of facilitating sharing of content, communication, collaboration, conversations, and the like. The view 510 of the email application 500 is an example of a view a user may encounter when interacting with the email application 500. In one example, the view 510 is a group view. The group view may be any view of email application 500 that is presently active and displayed.

In one example, the view 510 may include a ribbon 520, among other components. In one aspect, the ribbon 520 includes one or more group tools (e.g., the group tools 180 described herein relative to FIGS. 1C, 3A, and 3B). The one or more group tools may include a conversation trigger 521, a calendar trigger 522, a file trigger 524, and a notebook trigger 526. The conversation trigger 521 may provide access to group conversations. Group conversations may include group emails, short messages (e.g., instant messaging), and the like. In this regard, in response to a selection of the conversation trigger 521, group conversations (e.g., the group conversation history) associated with the view 510 may be rendered within the email application 500. The calendar trigger 522, the file trigger 524, and the notebook trigger 526 have the same functionality and/or features as the calendar trigger 318, the file trigger 320, and the notebook trigger 322 described herein relative to FIGS. 3A and 3B. As illustrated in FIG. 5, when a state of the ribbon 520 is expanded, the calendar trigger 522, the file trigger 524, and the notebook trigger 526 are located in and displayed within the ribbon 520. When a state of the ribbon 520 is collapsed, the calendar trigger 522, the file trigger 524, and the notebook trigger 526 are located in and displayed within the group view header (e.g., group view header 370 described relative to FIGS. 3A and 3B). As such, the group view and/or the group view header are reactive to a state of the ribbon 520.

Figure 6:
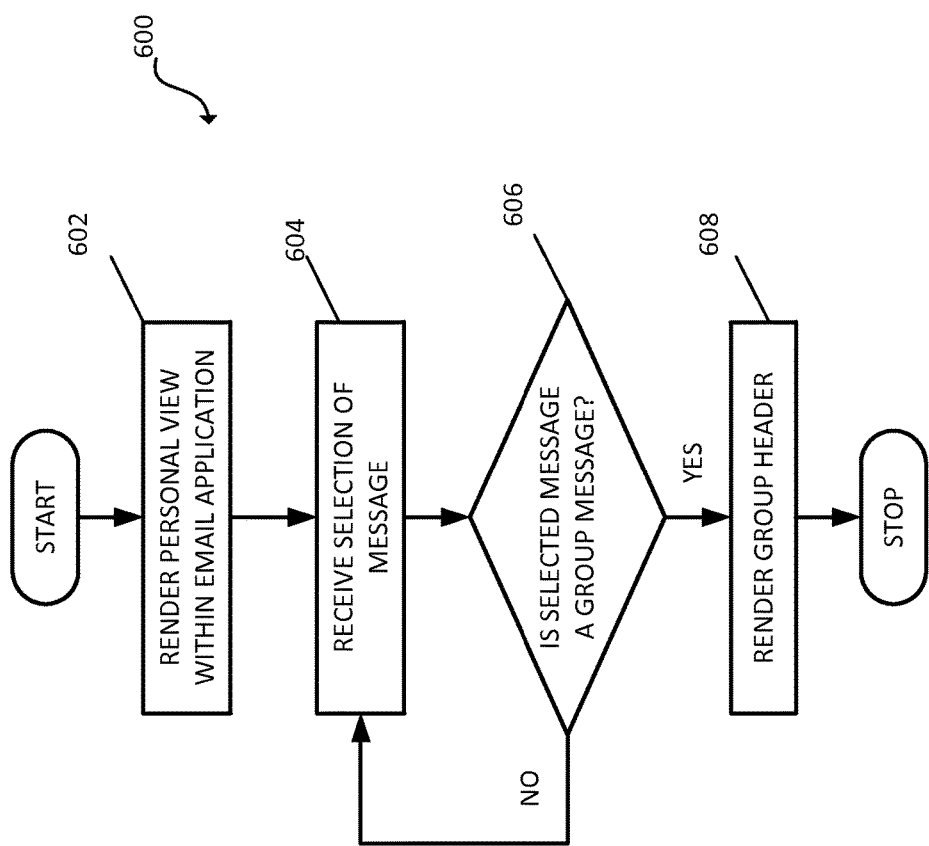
FIG. 6 illustrates an exemplary method for differentiating a conversation scope within an email application, according to an example aspect.

Referring now to FIG. 6, an exemplary method 600 for differentiating a conversation scope within an email application, according to an example aspect is shown. Method 600 may be implemented on a computing device or a similar electronic device capable of executing instructions through at least one processor. Method 600 may begin at operation 602, where a personal view is rendered within the email application. The personal view may include personal messages such as those messages associated with the inbox of the email application. In this regard, the personal view may include a plurality of messages. In some cases, the plurality of messages may include personal messages. In some cases, the personal view may include at least one personal message and at least one group message. The at least one group message may be associated with a group.

While in the personal view rendered within the email application, flow may proceed to operation 604 wherein a selection of a message is received. For example, a user of the email application may select one of the plurality of messages. In one example, a selection of one of the plurality of messages may include using a stylus or by direct physical contact of a user, e.g., touching the screen of the computing device. Contact may include, for instance, tapping the screen, using gestures such as swiping or pinching the screen, sketching on the screen, etc. In another example, a selection of one of the plurality of messages may include contacting the screen using a cursor, for example. In this regard, contact may include, for example, placing a cursor on the user interface using a device such as a mouse.

In response to receiving the selection of one of the plurality of messages, flow may proceed to operation 606 where it is determined whether the selected message is a group message. The group message may be associated with and belong to a group. A group may include a set of people who meet and/or do things together because they share the same purpose or ideas. For example, a group may include all the people working on the same project in a company. In another example, a group may include people who are interested in organic food and a healthy lifestyle. In one case, it is determined that the selected message is a group message when the group name is identified within the selected message. For example, the group name may be included in a "To" box of the selected message. In another example, it is determined that the selected message is a group message when a group Simple Mail Transfer Protocol (SMTP) address is identified within the selected message.

When it is determined that the selected message is a group message, flow may proceed to operation 608 where a group header is rendered within the personal view. The group header creates a visually compelling experience that enables a user to determine whether a message is part of a personal conversation or part of a larger group conversation. For example, the group header may include a group trigger. The group trigger may be an option for initiating rendering of a group view within the email application. The group view may be associated with the selected group message and include a group view header. In this regard, a user may go from experiencing a personal conversation to experiencing a group conversation by selecting the group trigger. In one case, the group trigger may comprise a group description and/or a button to initiate rendering of the group view associated with the group. In another case, the group trigger may comprise a group list to select from a list of groups to initiate rendering of a group view of a selected group from the group list. When it is determined that the selected message is not a group message, method 600 may return to operation 604 where a selection of a message is received.

The term rendering as used herein generally refers to the various capabilities employed in various computing architectures to assemble information that can then be used by other capabilities to generate an image or images. Within the context of method 600, for example, rendering a personal view and/or group header, for example, generally refers to assembling the information or data used to generate an image or images that together result in the personal view and/or group header. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the method 600, rendering a personal view and/or group header may refer to generating an image or images, from information assembled for that purpose, that together result in the personal view and/or group header, which can then be displayed.

It may also be appreciated that rendering in some scenarios may refer to a combination of the aforementioned possibilities. For example, rendering in some scenarios may refer to both assembling the information used to generate an image or images for a personal view and/or group header and then generating the image or images of the personal view and/or group header. In addition, a wide variety of other steps, processes, and stages may occur within the context of presenting views of an application, all of which may be considered part of presenting a view. Thus, yet one other variation on method 600 includes, but is not limited to, initiating the presentation of a primary view, receiving a selection of a message, determining whether the selected message is a group message, and initiating presentation of the group header.

FIG. 7 illustrates computing system 701 that is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes application 706, which is representative of the applications discussed with respect to the preceding FIGS. 1-6, including email applications 100, 200, 300, 400, and 500. When executed by processing system 702 to enhance group views and differentiating conversation scope, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced group views and conversation differentiation scope.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include application 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced group views. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Techniques for differentiating a conversation scope within an email application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of file history systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more computer readable storage media; and
program instructions stored on the one or more computer readable storage media that, when executed by at least one processor, cause the at least one processor to at least:
  initiate rendering of a personal view within an email application, wherein the personal view includes at least one personal email message and one group email message;
  determine whether a selected email message within the email application is a group email message, where the group email message belongs to a group;
  when it is determined that the selected email message is a group email message, initiate rendering of a group header within the personal view, where the group header differentiates a conversation scope between a personal conversation and a group conversation, wherein the group header includes at least an actionable group trigger;
  in response to activating, via the email application, the actionable group trigger, create a group view that defines at least one group determined to be associated with the selected group email message; and
  initiate rendering of the group view for the at least one group determined to be associated with the selected group email message within a user interface to the email application, wherein the group view includes a group view header.

2. The system of claim 1, wherein the group view includes at least a navigation pane, a message list, and a reading pane, and wherein the group view header is located above the message list and the reading pane.

3. The system of claim 1, wherein the group view header includes at least one or more informational components and one or more group tools.

4. The system of claim 3, wherein the one or more informational components includes at least one of a group profile image, a group description, a participation status, a group members preview, and a group member list option.

5. The system of claim 3, wherein the one or more group tools includes at least one of a notebook trigger, a file trigger, and a calendar trigger.

6. The system of claim 4, wherein the group description includes a group name and a group privacy indicator.

7. The system of claim 1, wherein the group header within the personal view further includes a group profile image and a group description.

8. The system of claim 3, wherein the email application includes a ribbon, and wherein the group view header is reactive to a state of the ribbon.

9. The system of claim 8, wherein the one or more group tools are located in the ribbon when the state of the ribbon is expanded.

10. A computer-implemented method for differentiating a conversation scope within an email application, the method comprising:
  rendering a personal view within the email application, wherein the personal view includes at least one personal email message and one group email message, wherein the at least one group email message belongs to a group;
  determining whether a selected email message within the email application is a group email message;
  when it is determined that the selected email message is a group email message, rendering a group header within the personal view, where the group header differentiates a conversation scope between a personal conversation and a group conversation, wherein the group header includes at least an actionable group trigger; and
  in response to activating, via the email application, the actionable group trigger, creating a group view that defines at least one group determined to be associated with the selected group email message; and
  rendering a group view for the at least one group determined to be associated with the selected group email message within a user interface to the email application.

11. The computer-implemented method of claim 10, wherein the group view includes a group view header.

12. The computer-implemented method of claim 11, wherein the group view includes at least a navigation pane, a message list, and a reading pane, and wherein the group view header is located above the message list and the reading pane.

13. The computer-implemented method of claim 11, wherein the group view header includes at least one of a group profile image, a group description, a participation status, a group members preview, a group member list option, a notebook trigger, a file trigger, and a calendar trigger.

14. The computer-implemented method of claim 13, further comprising in response to an indication of interest of at least one of the group profile image and the group description, displaying a group card.

15. The computer-implemented method of claim 13, further comprising in response to a selection of the notebook trigger, opening a notebook associated with the group.

16. The computer-implemented method of claim 13, further comprising in response to a selection of the calendar trigger, rendering a calendar associated with the group within the email application.

17. A computer-implemented method for differentiating a conversation scope within an email application, the method comprising:
- rendering a personal view within a user interface to the email application, wherein the personal view includes a plurality of email messages;
- determining whether a selected email message within the email application is a group email message, where the group email message belongs to a group; and
- when it is determined that the selected email message is a group message, determining whether the selected group email message belongs to one group or a plurality of groups;
- when it is determined that the selected group email message belongs to one group, creating a group header including at least an actionable group trigger based on the selected group email message determined to belong to one group; and
- rendering the group header within the personal view, where the group header differentiates a conversation scope between a personal conversation and a group conversation.

18. The computer-implemented method of claim 17, wherein the actionable group trigger based on the selected group email message determined to be associated with one group includes a group profile image, a group description, and an option for initiating rendering of a group view associated with the one group.

19. The computer-implemented method of claim 17, wherein when it is determined that the selected group email message belongs to a plurality of groups, creating a group header including at least an actionable group trigger based on the selected group email message determined to belong to a plurality of groups.

20. The computer-implemented method of claim 19, further comprising when the actionable group trigger is activated, activating a group list including the plurality of groups associated with the selected group email message to initiate rendering of a group view of a selected group from the group list, where the group view defines the selected group from the group list.

* * * * *